United States Patent
Hornegger et al.

(10) Patent No.: US 7,546,154 B2
(45) Date of Patent: Jun. 9, 2009

(54) METHOD AND APPARATUS FOR AUTOMATIC DETECTION OF ANOMALIES IN VESSEL STRUCTURES

(75) Inventors: Joachim Hornegger, Möhrendorf (DE); Marcus Prümmer, Criesbach (DE)

(73) Assignee: Siemens Aktiengesellschaft, Munich (DE)

( * ) Notice: Subject to any disclaimer, the term of this patent is extended or adjusted under 35 U.S.C. 154(b) by 757 days.

(21) Appl. No.: 10/836,946

(22) Filed: Apr. 30, 2004

(65) Prior Publication Data

US 2005/0010100 A1 Jan. 13, 2005

(30) Foreign Application Priority Data

Apr. 30, 2003 (DE) .................. 103 19 546

(51) Int. Cl.
*A61B 5/05* (2006.01)
(52) U.S. Cl. .................. 600/407; 600/457; 382/128
(58) Field of Classification Search ......... 600/454–467, 600/407; 382/128
See application file for complete search history.

(56) References Cited

U.S. PATENT DOCUMENTS

| | | | | |
|---|---|---|---|---|
| 3,857,052 A | * | 12/1974 | Beller | ............ 367/13 |
| 4,020,463 A | | 4/1977 | Himmel | |
| 5,267,332 A | | 11/1993 | Walch et al. | |
| 5,734,739 A | * | 3/1998 | Sheehan et al. | ............ 382/128 |
| 5,771,308 A | | 6/1998 | Florent | |
| 5,872,861 A | * | 2/1999 | Makram-Ebeid | ............ 382/130 |
| 5,891,030 A | | 4/1999 | Johnson et al. | |
| 6,503,202 B1 | * | 1/2003 | Hossack et al. | ............ 600/454 |
| 6,632,177 B1 | * | 10/2003 | Phillips et al. | ............ 600/458 |
| 6,912,471 B2 | * | 6/2005 | Heigl et al. | ............ 702/32 |
| 7,139,416 B2 | * | 11/2006 | Vuylsteke | ............ 382/128 |
| 7,209,777 B2 | * | 4/2007 | Saranathan et al. | ............ 600/410 |
| 2002/0099291 A1 | * | 7/2002 | Davidson et al. | ............ 600/451 |
| 2004/0091143 A1 | * | 5/2004 | Hu | ............ 382/154 |
| 2004/0252870 A1 | * | 12/2004 | Reeves et al. | ............ 382/128 |

FOREIGN PATENT DOCUMENTS

| | | | |
|---|---|---|---|
| WO | WO 00/45326 | * | 8/2000 |
| WO | WO 01/80185 | | 10/2001 |

* cited by examiner

*Primary Examiner*—Brian Casler
*Assistant Examiner*—Nasir Shahrestani
(74) *Attorney, Agent, or Firm*—Schiff Hardin LLP

(57) ABSTRACT

In a method and apparatus for fully automatic detection of anomalies in vessel structures, a 3D volume data set of an imaging 3D measurement of the vessel structure is obtained and, for an evaluation device, the vessel structure is detected in the 3D volume data set and subsequently is skeletonized in order to obtain a three-dimensional course of skeletonization paths. Characteristic quantities of the vessel structure are automatically determined along the skeletonization paths as features that are significant for an anomaly to be detected, in order obtain one or more feature series. The determined feature series are classified by non-linear imaging and comparison with reference feature series that have been determined for different classes of known vessel structures that contain different anomalies and known vessel structures without anomalies. Anomalies corresponding to the classification thus are identified.

10 Claims, 2 Drawing Sheets

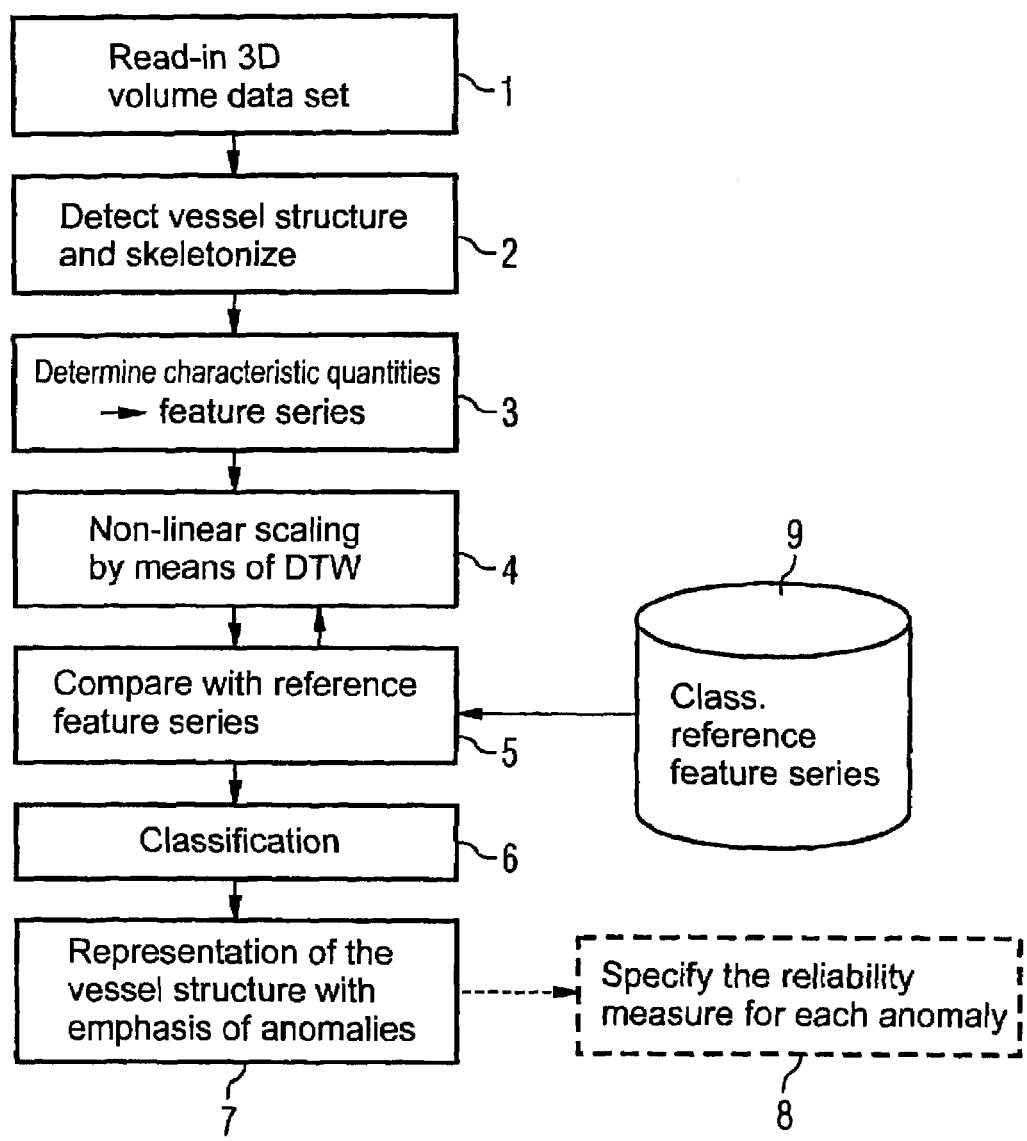

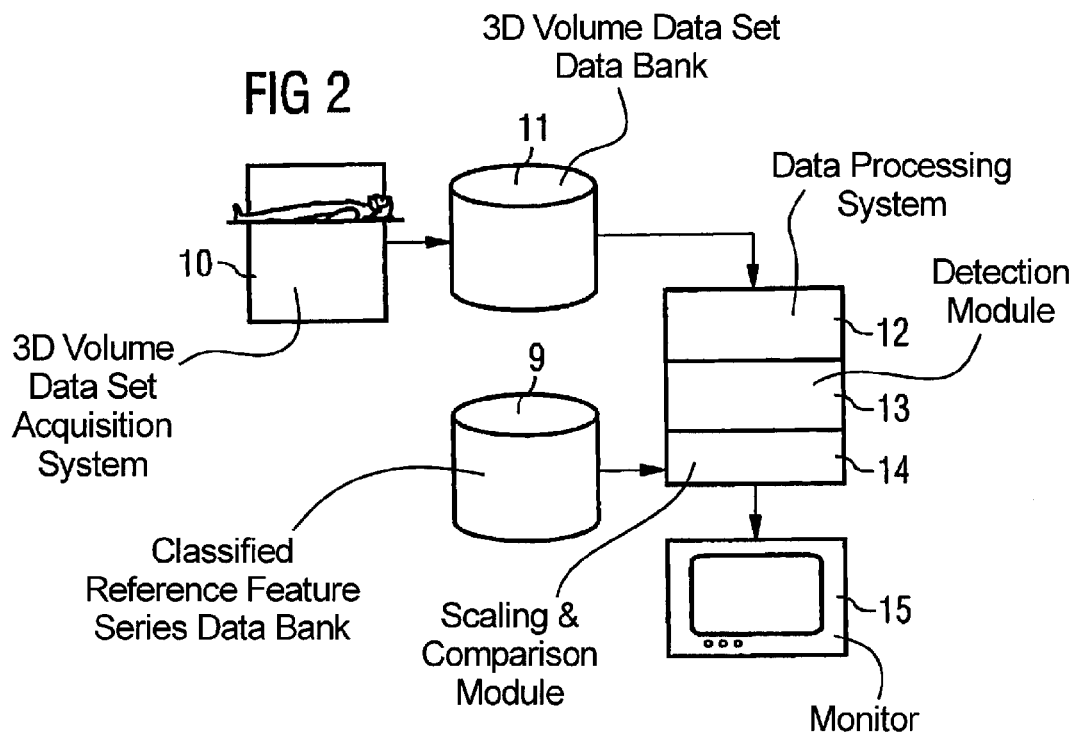
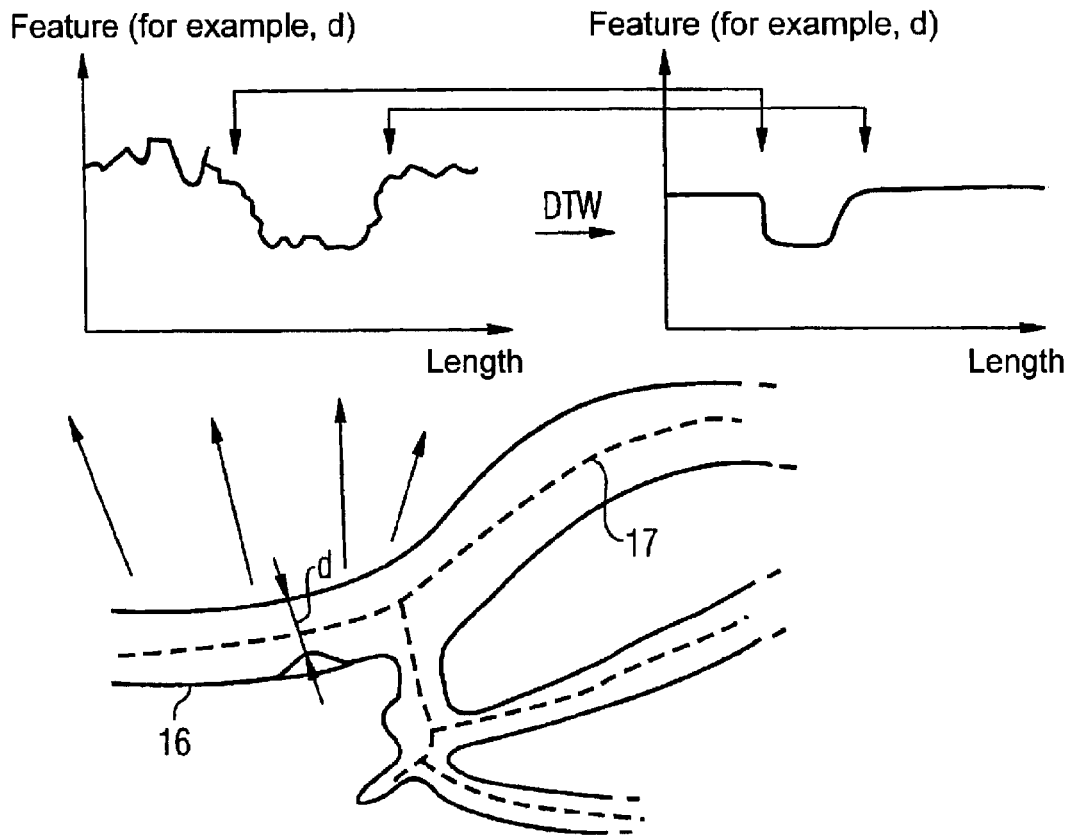

METHOD AND APPARATUS FOR AUTOMATIC DETECTION OF ANOMALIES IN VESSEL STRUCTURES

BACKGROUND OF THE INVENTION

1. Field of the Invention

The present invention concerns a method as well as an apparatus for automatic detection of anomalies in vessel structures, in which a 3D volume data set of an imaging 3D measurement of the vessel structure is obtained and characteristic quantities of the vessel structure are determined in order to be able to detect anomalies.

2. Description of the Prior Art

Modern three-dimensional imaging methods in medicine enable the detection and display of vessel structures of a patient, both in three-dimensional perspective and in cross-section perspective in arbitrarily selectable slice planes. By quantitative evaluation of the 3D volume data set acquired with the imaging methods, vessel structures can be measured and relevant characteristic quantities of these vessel structures can be determined. Such characteristic quantities can be, for example, the course of the vessel cross-section, the vessel segment length, vessel branchings or the curve of the vessel. These characteristic quantities can be automatically acquired from the volume data set by data processing and can be used to detect vessels with pathological abnormalities. Of particular importance are hereby vessel narrowings (stenoses) and vessel widenings (aneurysms).

German Translation 695 22 844 deals with the problem of the detection of anomalies such as stenoses using angiographs of the human or animal body. The concern of this publication, however, is not the detection of anomalies, but rather skeletonization of the vessel structures from two-dimensional angiography images as well as the determination of the width of the vessel structures along its course. The method proposed in the printed publication should automatically enable a precise determination of these features of the vessels.

PCT Application WO 00/45326 describes a method for automatic localization and extraction of curves in images, in particular of anatomical structures in medical images, in which dynamic programming is used to localize the curves. No detection of anomalies in vessel structures is undertaken with the method.

U.S. Pat. No. 5,891,030 discloses a method for visualization of tube-shaped structures of a patient using a CT system. In this method, the center line of the tube-shaped structure is determined in the CT images in order to generate based on this different image representations of the tube-shaped structure. This publication also does not deal with the detection of anomalies in vessel structures.

To detect anomalies in vessel structures from 3D volume data sets, it is necessary to compare the determined characteristic quantities with reference quantities in order to be able to decide about the existence or nonexistence of an anomaly. In conventional applications, these reference quantities have to be manually determined in order to be able to effect a quantification (for example of the degree of a stenosis) of a vessel section established by the user. This known technique of the detection of anomalies using the image date is, however, very complicated.

SUMMARY OF THE INVENTION

An object of the present invention is to provide a method as well as an apparatus for automatic detection of anomalies in vessel structures that can be implemented with reduced time expenditure for the user.

In the inventive method for automatic detection of anomalies in vessel structures, a 3D volume data set of an imaging 3D measurement of the vessel structure is first obtained. The subsequent steps are implemented completely automatically by an evaluation device that for example can be part of a data processing system. First, the vessel structure in the volume data set is detected and skeletonized using density values in order to obtain a three-dimensional course of skeletonization paths. Characteristic quantities of the vessel structure are determined along the skeletonization paths as features that are significant for an anomaly to be detected in order to obtain one or more feature series. The determined feature series are classified by comparison with reference feature series that have been previously determined for different classes of known vessel structures—vessel structures with different anomalies as well as vessel structures without anomalies. In this comparison, the determined feature series are non-linearly imaged in order to match local different expansions of vessel sections of the vessel structure to be examined and the vessel structures for the reference feature series, The non-linear imaging ensues on the basis of the feature series and reference feature series. Finally, the anomalies corresponding to classification are identified to the user.

The inventive apparatus to implement the above method has a data processing system with a detection module that detects a vessel structure in a read-in 3D volume data set, skeletonizes this vessel structure and determines predeterminable characteristic quantities along the skeletonization path as features and prepares them as one or more feature series. The data processing system has a scaling and comparison module in which the determined feature series are non-linearly imaged or, scaled in order to match the expansion of the examined vessel structure locally to the expansion of reference vessel structures, as well as to compare the scaled feature series with the reference feature series in order to classify the determined feature series and identify anomalies corresponding to the classification. The data processing system has a storage unit in which the reference feature series are stored, or is connected with an external storage unit.

Stenoses and aneurysms can be detected completely automatically from 3D volume data sets with the present method and the associated apparatus, The method as well as the apparatus enable the evaluation of all vessel structures existing in the volume data set without the intervention of the user. To determine the characteristic quantities, the user no longer has to manually determine or select the reference quantities. The complete vessel structure can be analyzed and classified without the help of the user. The inventive method and the associated apparatus thus significantly reduce the work expenditure for the user and lead to a significant improvement of the clinical workflow.

The method as well as the apparatus in particular offer the advantage of enabling the differentiation of pathological and healthy vessel sections in an arbitrary vessel structure. In a preferred embodiment of the method as well as of the apparatus, the anomalies detected in this manner are identified in a 3D perspective by coloring, but other types of emphasis can be used. In a further advantageous embodiment, at each detected anomaly a reliability measure as to whether the detected anomaly exists is specified. This reliability measure is calculated on the basis of the degree of coincidence of the determined feature series with the closest reference feature series, on the basis of which the classification ensues.

The non-linear imaging necessary for the evaluation of arbitrary vessel structures preferably is implemented by a technique of dynamic programming known as Dynamic Time Warping: DTW. With this technique, an arbitrary healthy vessel can be automatically differentiated from a pathological vessel. This was previously possible only with manual support of the user. The technique of dynamic programming is known to those skilled in the art from the field of speech processing and is described, for example, in the book by Paulus, Dietrich W. R. and Homegger, Joachim, "Applied Pattern Recognition: Algorithms and Implementation in C++", Vieweg Verlag, 4th edition 2003.

The reference feature series necessary for the classification are created in the preliminary stages using representative data. These reference feature series represent reference patterns that have been determined from the feature space of a known vessel structure. In order to be able to differentiate vessels with and without pathological findings, various classes of known vessels are created with and without findings. For this purpose, 3D exposures of vessels with known degrees of stenosis as well as healthy vessels are used. If the reference patterns are created, these are for example divided corresponding to the criteria "healthy", "degree X of stenosis" and "aneurysm". For an automatic detection of an anomaly using the present method, the location of the anomaly in the vessel structure is shown together with the aforementioned classification and, as the case may be, a degree of reliability for this automatic diagnosis.

The comparison of the determined feature series with the reference feature series or reference patterns can be implemented with known pattern recognition methods of imaging data processing. Suitable methods are known to those skilled in the art.

DESCRIPTION OF THE DRAWINGS

FIG. 1 is an exemplary flow chart of the inventive method.

FIG. 2 is a block diagram showing the basic component of an embodiment of the invention apparatus to implement the inventive method.

FIG. 3 shows an example for a section from a vessel structure to illustrate the technique of DTW.

DESCRIPTION OF THE PREFERRED EMBODIMENTS

In the implementation of the present method, a 3D volume data set that represents (contains) the vessel structure is first obtained. This volume data set can be generated, for example, by magnetic resonance, computed tomography or C-arm CT measurement of the body region of the patient containing the vessel structure. After reading in the 3D volume data set in step 1 of the flow chart shown in FIG. 1, the characteristic quantities necessary for automatic detection of aneurysms and stenoses are determined. The vessel structure first must be detected within the 3D volume data set, and with the vessel structure the vessel axes must be determined and brought into a structural relationship (skeletonization). This ensues in the step 2 of the work flow. The detection of the vessel structure can ensue with a threshold method, since the vessels exhibit characteristic density values within the detector segment. After application of an interpolation method to fill only gaps that may be present, and the calculation of the surface of the vessel structure, the skeletonization paths are then calculated by determining of the vessel focal points in the surfaces laterally intersecting the vessel. Along the skeletonization paths (center lines), in step 3 a number of characteristic quantities are then determined that are significant for the detection of anomalies, in particular aneurysms and stenoses. Examples for such characteristic quantities are the minimal and maximal vessel diameter orthogonal to the skeletonization path, the local curve of skeletonization paths, the vessel enclosure circumference, and the ratio of path length to vessel enclosure diameter or to vessel circumference. All of these characteristic quantities are automatically determined from the 3D volume data set by the evaluation unit of the data processing system. Series of feature vectors for analysis of the vessel structures are generated from the determined characteristic quantities. Each feature vector represents the different characteristic quantities of the vessels at a particular location of the skeletonization path A sequence of the feature vectors, what is known as a feature series, characterizes the course of the vessel along the skeletonization path.

In order to be able to effect the classification of the examined vessel structure, reference is made to a databank 9 with classified reference feature series is accessed, These reference feature series represent reference patterns that have been determined from the feature space of known vessel structures. The databank contains a number of such reference patterns of known vessels or vessel structures with and without findings, that are classified according to the criteria "healthy", "degree X of stenosis" and "aneurysm".

In the comparison with these classified reference patterns or reference feature series, the unknown vessel structure in the 3D volume data set is respectively suitably non-linearly imaged since it normally has a different expansion from the vessel structures forming the basis of the reference feature series. This matching ensues by a non-linear imaging of the determined feature series of the vessel structure in step 4 of FIG. 1. In the present example, this non-linear imaging of the feature series is effected by means of dynamic programming (DTW). The non-linear imaging ensues in each individual comparison with a reference feature series. By the comparison of the non-linearly imaged feature series with the classified reference feature series in step 5, the classification of the reference feature series that exhibits the highest degree of coincidence with the present feature series is adopted for the present vessel structure (step 6). After the implementation of these steps for the entire vessel structure comprised in the 3D volume data set or a predetermined segment from this vessel structure, it is shown on a monitor 15 either section-by-section or completely in step 7, with the vessel sections for which anomalies have been determined being identified in color. The user thus immediately sees regions of the vessel structure that contain possible stenoses or aneurysms. Optionally, a measure of reliability that gives the user an indication of the reliability within which the respective anomaly has been determined can be output for the individual vessel sections exhibiting anomalies (step 8). This reliability measure is generated in a simple manner from the degree of coincidence with the reference feature series corresponding to the classification. The smaller the degree of coincidence with the most closely matching reference feature series, the lower the reliability measure; the higher the degree of coincidence, the higher the reliability measure.

FIG. 2 shows the basic design of an apparatus to implement the above-described method. This apparatus has a data processing system 12 connected with a storage device 11 that contains the 3D volume data set or sets to be processed. The volume data sets are generated by the examination of a patient in an angiography, CT or MR system 10. After reading in the respective 3D volume data set, the steps 2 and 3 of FIG. 1 are implemented in a detection module 13, which prepares the corresponding feature vectors and forwards them to the scaling and comparison device 14 of the data processing system 12. The steps 4-8 then ensue in this scaling and comparison device 14 with access to the databank 9 for the classified reference feature series. The vessel structure is shown at least in sections on a monitor 15, and the detected anomalies can be identified in the representation.

FIG. 3 shows an example for the course of a vessel structure 16 in section. In this representation, the skeletonization paths 17 that are determined by the detection module 13 are also indicated. FIG. 3 shows as an example a determination of the diameter d of a vessel section along the skeletonization path. In the left upper diagram, the course of this diameter determined from the 3D volume data is imaged dependent on the length of the skeletonization path. The right upper diagram shows this characteristic quantity (diameter d) over the length of a vessel section of a reference vessel structure. This reference pattern of the feature shows a stenosis, meaning a vessel narrowing, that exhibits, however, a lesser length in comparison with the reference vessel structure, due to the different expansion of the present vessel structure. The feature in question of the measured course of the diameter is therefore non-linearly imaged with the presently used technique of DTW, in order to be able to implement a comparison with the reference pattern. This is indicated by the two arrows proceeding between the diagrams in FIG. 3, The DTW hereby leads to a compression of the length in the measured diagram, such that a comparison of both features provides a higher degree of coincidence. With the method as well as the associated apparatus, in the present example a stenosis therefore can be identified in the vessel section being viewed. A stenosis thus can be detected with greater reliability in this area solely by the detection of the feature of the diameter. Naturally, in the present method additional characteristic quantities (as cited above by example) can also be included in the comparison. The corresponding non-linear imaging thereby ensues in the same manner for all features.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for fully automatically detecting anomalies in vessel structures, comprising the steps of:

obtaining a 3D volume dataset representing an image of an in vivo vessel structure;

supplying said 3D volume dataset to an electronic evaluation device and, in said electronic evaluation device, automatically identifying said vessel structure in said 3D volume dataset and automatically skeletonizing said vessel structure to obtain a three-dimensional course of skeletonization paths, each having a skeletonization path length;

in said evaluation device, along the skeletonization path of each skeletonization path, automatically electronically determining multiple characteristic quantities of said vessel structure as features relevant for an anomaly and forming at least one determined feature series from said features that represents said features along the skeletonization path length of that skeletonization path;

storing respective reference feature series for each of different classes of known vessel structures each having a vessel structure length, said known vessel structures comprising known vessel structures with different anomalies and known vessel structures without anomalies, each reference feature series comprising multiple characteristic quantities that represent the known vessel structure along the vessel structure length of that known vessel structure;

non-linearly imaging said at least one determined feature series to obtain a non-linear feature series, and automatically electronically matching said non-linear feature series to a closest one of said reference feature series with length, due to said non-linear imaging, being removed as a factor that would otherwise prevent a match to said closest one of said reference feature series;

designating anomalies, if present, in the skeletonization path associated with said at least one determined feature series as corresponding to anomalies, if present, in said closest one of said reference feature series; and displaying an image of said vessel structure with said anomaly, if present, designated in said image.

2. A method as claimed in claim 1 comprising non-linearly imaging set at least one feature series by dynamic programming.

3. A method as claimed in claim 1 comprising displaying a 3D image of said vessel structure.

4. A method as claimed in claim 1 comprising emphasizing said anomaly, if present, in the displayed image with a color distinguishable from a remainder of said image.

5. A method as claimed in claim 1 comprising calculating a reliability measure for the presence of an anomaly dependent on a degree of coincidence between said non-linear feature series and said one of said reference feature series, and displaying said reliability measure associated with said anomaly.

6. A method as claimed in claim 1 comprising matching said non-linear feature series with said one of said reference feature series using a pattern recognition technique.

7. An apparatus for fully automatically detecting anomalies in vessel structures, comprising:

a data source for obtaining a 3D volume dataset representing an image of an in vivo vessel structure;

an electronic evaluation device supplied with said 3D dataset, said electronic evaluation device being configured to automatically electronically identify said vessel structure in said 3D volume dataset and to automatically skeletonize said vessel structure to obtain a three-dimensional course of skeletonization paths each having a skeletonization path length, and for each skeletonization path, to automatically electronically determine multiple characteristic quantities of said vessel structure along the skeletonization path length thereof as features relevant for an anomaly and to form at least one feature series from said features that represents said features along the skeletonization path length of that skeletonization path;

a memory containing stored reference feature series respectively for each of different classes of known vessel structures each having a vessel structure length, said known vessel structures comprising known vessel structures with different anomalies and known vessel structures without anomalies each reference feature series comprising multiple characteristic quantities that represent the know vessel structure along the vessel structure length of that known vessel structure;

said electronic evaluation device being configured to non-linearly image said at least one determined feature series to obtain a non-linear feature series, and automatically electronically matching said non\-linear feature series to a closest one of said reference feature series with length, due to said non-linear imaging, being removed as a factor that would otherwise prevent a match to said closest one of said reference feature series;

a display; and said evaluation device being configured to anomalies, if present, in the skeletonization path in a display of said skeletonization path at said display, associated with said at least one determined feature series as corresponding to anomalies, if present, in said closest one of said reference feature series.

8. A method as claimed in claim 2 comprising non-linearly imaging said at least one determined feature series using dynamic time warping as said dynamic programming.

9. An apparatus as claimed in claim 7 wherein said electronic evaluation device is configured to non-linearly image said at least one determined feature series by dynamic programming.

10. An apparatus as claimed in claim 9 wherein said electronic evaluation device is configured to non-linearly image said at least one determined feature series using dynamic time warping as said dynamic programming.

* * * * *